US010823293B2

(12) United States Patent
Edwards et al.

(10) Patent No.: US 10,823,293 B2
(45) Date of Patent: Nov. 3, 2020

(54) VALVE DISC ASSEMBLIES FOR FLUID VALVES HAVING SOFT SEATS

(71) Applicant: Emerson Vulcan Holding LLC, St. Louis, MO (US)

(72) Inventors: Mark Stephen Edwards, Black Mountain, NC (US); Matthew Douglas Forbes, Candler, NC (US)

(73) Assignee: EMERSON VULCAN HOLDING LLC, St. Louis, MO (US)

( * ) Notice: Subject to any disclaimer, the term of this patent is extended or adjusted under 35 U.S.C. 154(b) by 0 days.

(21) Appl. No.: 16/042,815

(22) Filed: Jul. 23, 2018

(65) Prior Publication Data

US 2020/0025302 A1    Jan. 23, 2020

(51) Int. Cl.
| F16K 1/46 | (2006.01) |
| F16K 1/36 | (2006.01) |
| F16K 17/196 | (2006.01) |
| F16K 17/04 | (2006.01) |
| F16K 17/08 | (2006.01) |

(52) U.S. Cl.
CPC ............... *F16K 1/46* (2013.01); *F16K 1/36* (2013.01); *F16K 17/0486* (2013.01); *F16K 17/082* (2013.01); *F16K 17/196* (2013.01)

(58) Field of Classification Search
CPC ...... F16K 17/02; F16K 17/04; F16K 17/0486; F16K 17/0466; F16K 17/08; F16K 17/082; F16K 17/06; F16K 17/19; F16K 17/17; F16K 17/196; F16K 15/026; F16K 15/028; F16K 15/18; F16K 1/34; F16K 1/36; F16K 1/46; Y10T 137/7932
See application file for complete search history.

(56) References Cited

U.S. PATENT DOCUMENTS

| 1,696,452 A | * | 12/1928 | Raymond | ............... F16K 17/10 137/477 |
| 1,743,430 A | * | 1/1930 | Granges | .................. F16K 17/08 137/478 |
| 1,925,323 A | * | 9/1933 | Hopkins | ................. F16K 17/08 137/478 |

(Continued)

FOREIGN PATENT DOCUMENTS

| BE | 629908 | 8/1961 |
| CH | 344274 | 1/1960 |

(Continued)

OTHER PUBLICATIONS

Emerson, "Kunkle Series 6000 Safety Valves," Safety and Relief Products, VCTDS-00394-EN, 2017, 2 pages.

(Continued)

*Primary Examiner* — David Colon-Morales (74) *Attorney, Agent, or Firm* — Hanley, Flight & Zimmerman, LLC (57) ABSTRACT

Valve disc assemblies for fluid valves having soft seats are disclosed herein. An example valve disc assembly for a fluid valve comprises a first portion to slidably engage a wall of the fluid valve to guide movement of the valve disc assembly and a second portion to receive a valve stem to control a position of the valve disc assembly, the second portion including an angled surface to retain a seal between the first and second portions.

20 Claims, 4 Drawing Sheets

(56) References Cited

U.S. PATENT DOCUMENTS

| | | | | |
|---|---|---|---|---|
| 1,949,150 A * | 2/1934 | Eplett | F16K 17/08 | 137/470 |
| 2,021,773 A * | 11/1935 | Gentzel | F16K 17/082 | 251/333 |
| 2,145,870 A * | 2/1939 | Gentzel | F16K 17/08 | 137/543 |
| 2,151,501 A * | 3/1939 | Corcoran | F16K 17/08 | 137/468 |
| 2,277,655 A * | 3/1942 | Falls | F16K 17/0426 | 137/478 |
| 2,277,656 A * | 3/1942 | Falls | F16K 17/082 | 137/478 |
| 2,414,794 A * | 1/1947 | Bergquist | F16K 17/082 | 137/477 |
| 2,517,858 A * | 8/1950 | Farris | F16K 17/082 | 137/469 |
| 2,597,057 A * | 5/1952 | Bergquist | F16K 17/0433 | 137/470 |
| 2,628,632 A * | 2/1953 | Dayton | F16K 17/0433 | 137/469 |
| 2,631,605 A * | 3/1953 | Tobis | F16K 17/082 | 137/472 |
| 2,661,016 A * | 12/1953 | Leffler | F16K 17/082 | 137/469 |
| 2,666,448 A * | 1/1954 | Garretson | F16K 1/34 | 137/540 |
| 2,672,882 A * | 3/1954 | Bergquist | F16K 17/0433 | 137/478 |
| 2,678,187 A * | 5/1954 | Peters | F16K 1/46 | 251/357 |
| 2,845,945 A * | 8/1958 | Mancusi, Jr. | F16K 1/46 | 137/469 |
| 3,057,372 A | 10/1962 | Sutton et al. | | |
| 3,354,900 A * | 11/1967 | Ferrill | F16K 17/0433 | 137/477 |
| 3,543,777 A * | 12/1970 | Howes | F16K 37/0083 | 137/551 |
| 3,794,295 A | 2/1974 | Huber et al. | | |
| 3,854,494 A * | 12/1974 | Zahorsky | F16K 17/0433 | 137/472 |
| 4,036,250 A * | 7/1977 | Dashner | F16K 17/0433 | 137/476 |
| 4,129,145 A * | 12/1978 | Wynn | F16K 15/026 | 137/515 |
| 4,474,358 A * | 10/1984 | Bennett | F16K 1/46 | 251/357 |
| 4,595,033 A * | 6/1986 | Walsh, Jr. | F16K 17/08 | 137/529 |
| 4,688,757 A * | 8/1987 | Cook | F16K 1/46 | 251/210 |
| 5,046,524 A * | 9/1991 | Crichton, Jr. | F16K 17/08 | 137/478 |
| 5,738,333 A * | 4/1998 | Cognevich | F16K 17/105 | 137/489.5 |
| 5,782,259 A * | 7/1998 | Ledbetter | F16K 17/04 | 137/478 |
| 6,668,853 B2 * | 12/2003 | Dean | F16K 17/04 | 137/315.01 |
| 6,708,951 B2 * | 3/2004 | Jones | F16K 1/36 | 251/333 |
| 7,513,270 B2 * | 4/2009 | Martin | F16K 17/0426 | 137/469 |
| 9,869,396 B2 * | 1/2018 | Varga | F16K 1/36 | |
| 10,125,881 B2 * | 11/2018 | Choate | F16K 17/06 | |
| 10,337,633 B2 * | 7/2019 | Grenaway | F16K 27/0281 | |

FOREIGN PATENT DOCUMENTS

| | | |
|---|---|---|
| EP | 2425157 | 3/2012 |
| GB | 663333 | 12/1951 |
| GB | 884529 | 12/1961 |
| GB | 2137736 | 10/1984 |
| GB | 2137736 A * | 10/1984 |
| GB | 2343498 | 5/2000 |

OTHER PUBLICATIONS

International Searching Authority, "International Search Report," issued in connection with International Patent Application No. PCT/US2019/041511, dated Sep. 30, 2019, 6 pages.

International Searching Authority, "Written Opinion," issued in connection with International Patent Application No. PCT/US2019/041511, dated Sep. 30, 2019, 12 pages.

* cited by examiner

VALVE DISC ASSEMBLIES FOR FLUID VALVES HAVING SOFT SEATS

FIELD OF THE DISCLOSURE

This disclosure relates generally to fluid valves and, more particularly, to valve disc assemblies for fluid valves having soft seats.

BACKGROUND

Pressure relief valves are used in a variety of commercial, industrial, and domestic applications to maintain a pressure within a system below a predetermined maximum pressure. Specifically, if the pressure within the system exceeds the predetermined maximum pressure, the pressure relief valve vents a fluid or vapor to the atmosphere and/or other outlet until the pressure within the system decreases below the predetermined maximum pressure. The amount and rate at which the fluid or vapor is vented to the atmosphere and/or other outlet is associated with the magnitude of the pressure within the system.

Different pressure relief valves have different sizes, start-to-discharge pressures (e.g., a pressure at which fluid begins to flow within the pressure relief valve), and flow capacities. A pressure relief valve may be selected for use with a system based on a design specification of the system such as a maximum pressure to which a component within the system (e.g., a pressure vessel) can be safely exposed.

Known pressure relief valves often include a single spring that exerts a force on a stem to urge a valve disc towards a valve seat. A fluid valve can include a soft seat that is made of a softer material, such as a polytetrafluoroethylene (PTFE) or another elastomer (e.g., nitrile rubber (NBR), ethylene propylene diene monomer (EPDM) rubber, etc.). In some examples, the soft seat disc is fitted to a valve body (e.g., not integral to the valve body). When the valve disc engages the valve seat, fluid flow within the pressure relief valve is prevented. When pressure within the system exceeds the maximum pressure, the force exerted by the spring is overcome, and the valve disc is urged away from the valve seat. Thus, pressure is reduced in the system until it falls below the maximum pressure.

SUMMARY

An example valve disc assembly for a fluid valve disclosed herein includes a first portion to slidably engage a wall of the fluid valve to guide movement of the valve disc assembly and a second portion to receive a valve stem to control a position of the valve disc assembly, the second portion including an angled surface to retain a seal between the first and second portions.

Another example valve disc assembly for a fluid valve disclosed herein includes a first portion having an opening to receive a retainer and a second portion to receive a valve stem to control a position of the valve disc assembly, the second portion including an angled surface to retain a seal between the first and second portions, the seal to releasably engage a valve seat.

Another example valve disc assembly for a fluid valve disclosed herein includes a first portion including an opening, the opening having a first diameter, and a second portion including a stem portion to receive a valve stem to control a position of the valve disc assembly, the stem portion to couple the second portion to the first portion through the opening, and a base to retain a seal between the first portion and the second portion, the base having a second diameter greater than the first diameter.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Valve disc assemblies used in fluid valves having soft seats disclosed herein provide significant improvements over known valve disc assemblies (e.g., those described in connection with FIGS. 1 and 2). These known valve disc assemblies are made using large amounts of material, and, as a result, are expensive to manufacture. Additionally, the designs of these known valve disc assemblies are difficult to manufacture (e.g., more difficult to achieve proper surface finish, more difficult to machine, more difficult to accurately measure feature dimensions, etc.), and assembly of these valve disc assemblies requires significant experience. In some examples, incorrect assembly leads to part damage and/or improper function of a valve disc assembly. The valve disc assemblies disclosed herein (e.g., in FIGS. 3 and 4) significantly reduce the amount of material required to manufacture, thereby reducing manufacturing costs. Further, the valve disc assemblies disclosed herein substantially improve assembly, manufacturing, and measurement processes associated with the valve disc assemblies.

Figure 1:
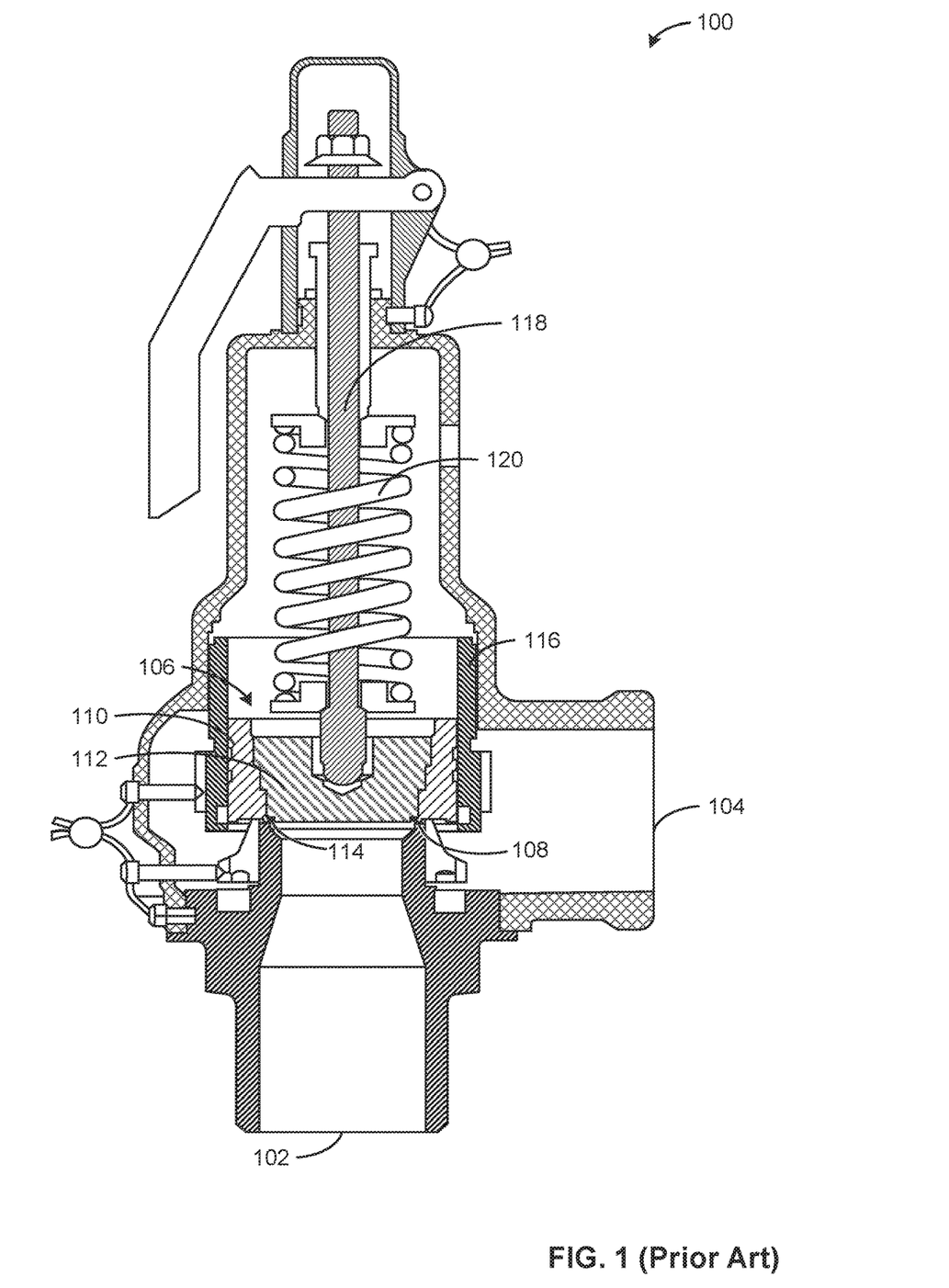
FIG. 1 is a cross-sectional view of an example known fluid valve that includes a known valve disc assembly.

FIG. 1 is a cross-sectional view of an example known fluid valve 100 that includes a known valve disc assembly. In the illustrated example, the fluid valve 100 is a pressure relief valve. The fluid valve 100 includes an inlet 102 and an outlet 104. In some examples, the inlet 102 and/or the outlet 104 are threaded to facilitate coupling of the fluid valve 100 to other devices or apparatus (e.g., a pressure vessel, a tank, etc.). In some examples, the inlet 102 is fluidly coupled to a tank, container, pressure vessel, pipe transporting fluid, and/or another apparatus used to store or transport fluid. In such examples, the fluid valve 100 operates to reduce pressure in a system and/or prevent the pressure in the system from exceeding a predetermined maximum pressure. For example, when pressure increases within a pressure vessel that is fluidly coupled to the fluid valve 100, the fluid valve 100 allows fluid to flow between the inlet 102 and the outlet 104. In some examples, the outlet 104 is fluidly coupled to the atmosphere, venting fluid to the atmosphere when the pressure in the fluid valve 100 exceeds the maximum pressure.

In the illustrated example, fluid entering the inlet 102 cannot flow through the fluid valve 100 to the outlet 104 because a valve disc assembly 106 prevents fluid flow through the fluid valve 100. The valve disc assembly 106 releasably engages a seating surface 108 of the fluid valve 100. In some examples, the seating surface 108 is a soft material such as PTFE or an elastomer. When the valve disc assembly 106 is in contact with the seating surface 108, the valve disc assembly 106 prevents fluid flow within the fluid valve 100. The valve disc assembly 106 includes a soft seat disc 110 and a soft seat retainer 112. In some examples, the soft seat retainer 112 is threadably coupled to the soft seat disc 110. In some examples, the soft seat retainer 112 is coupled to the soft seat disc 110 using other coupling means (e.g., press fit, welding, soldering, snap fit, etc.). The valve disc assembly 106 further includes a seal 114 between the soft seat disc 110 and the soft seat retainer 112. The seal 114 prevents fluid from leaking between the valve disc assembly 106 and the seating surface 108 and/or between the soft seat disc 110 and the soft seat retainer 112 during operation of the fluid valve 100.

In the illustrated example, the soft seat disc 110 slidably engages a guide 116. The guide 116 guides movement of the valve disc assembly 106 during operation of the fluid valve 100. For example, the guide 116 enables only vertical movement (e.g., up or down in the orientation of FIG. 1) of the valve disc assembly 106. The soft seat retainer 112 is coupled to a stem 118 that controls the position of the valve disc assembly 106 within the fluid valve 100. The stem 118 is coupled to a spring 120 that biases the stem 118 toward the seating surface 108. The spring 120 is to impart a predetermined force on the valve disc assembly 106. For example, the spring 120 has a known spring constant and is compressed a predetermined amount to generate the predetermined force exerted on the valve disc assembly 106. The force exerted by the spring 120 maintains the position of the valve disc assembly 106 (e.g., positioned on the seating surface 108 to prevent the flow of fluid through the fluid valve 100) until pressure at the inlet 102 creates a force on the valve disc assembly 106 that overcomes the predetermined force of the spring 120. For example, pressure at the inlet 102 is applied to the valve disc assembly 106, thus generating a force (e.g., pressure multiplied by an area of the valve disc assembly 106). Accordingly, when the pressure at the inlet 102 exceeds an allowable pressure, the valve disc assembly 106 is released from the seating surface 108 (e.g., by moving upward), allowing fluid to flow to the outlet 104.

When pressure at the inlet 102 increases, the valve disc assembly 106 moves further from the seating surface 108, allowing more fluid to flow through the fluid valve 100. As pressure at the inlet 102 decreases, the valve disc assembly 106 is urged toward the seating surface 108 by the stem 118 (e.g., biased by the spring 120) until the valve disc assembly 106 engages the seating surface 108 to prevent fluid flow in the fluid valve 100.

Figure 2A:
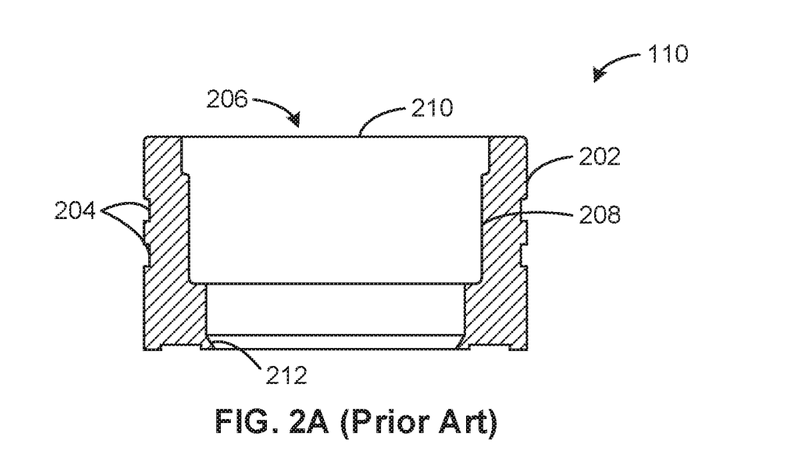
FIG. 2A is a cross-sectional view of the example known soft seat disc assembly of FIG. 1.

FIG. 2A is a cross-sectional view of the known soft seat disc 110 of FIG. 1. The soft seat disc 110 includes a guiding surface 202 that contacts a guide of a fluid valve (e.g., the guide 116 of FIG. 1). The guiding surface 202 includes cavities 204 that reduce drag and/or friction during movement of the valve disc assembly 106 within the fluid valve 100.

The soft seat disc 110 of the illustrated example further includes an opening 206 that receives a retainer (e.g., the soft seat retainer 112 of FIG. 1). The opening 206 spans the vertical length of the soft seat disc 110 (e.g., the opening 206 is continuous through the entire soft seat disc 110), giving the soft seat disc 110 an annular shape. The soft seat disc 110 further includes an interior threaded portion 208 to threadably couple the soft seat retainer 112 to the soft seat disc 110. The soft seat retainer 112 can be inserted into the soft seat disc 110 through an example entry 210 of the opening 206 (e.g., the top of the soft seat disc 110) to facilitate coupling of the soft seat retainer 112 to the soft seat disc 110. The soft seat disc 110 further includes an angled surface 212 within the opening 206 at an end of the soft seat disc 110 opposite the entry 210. The angled surface 212 faces radially inward (e.g., toward a central axis of the soft seat disc 110). When the soft seat retainer 112 is threadably coupled to the soft seat disc 110, a seal (e.g., the seal 114 of FIG. 1) is positioned between the soft seat retainer 112 and the angled surface 212 to prevent fluid from leaking between the valve disc assembly 106 and the seating surface 108 and/or between the soft seat disc 110 and the soft seat retainer 112.

Figure 2B:
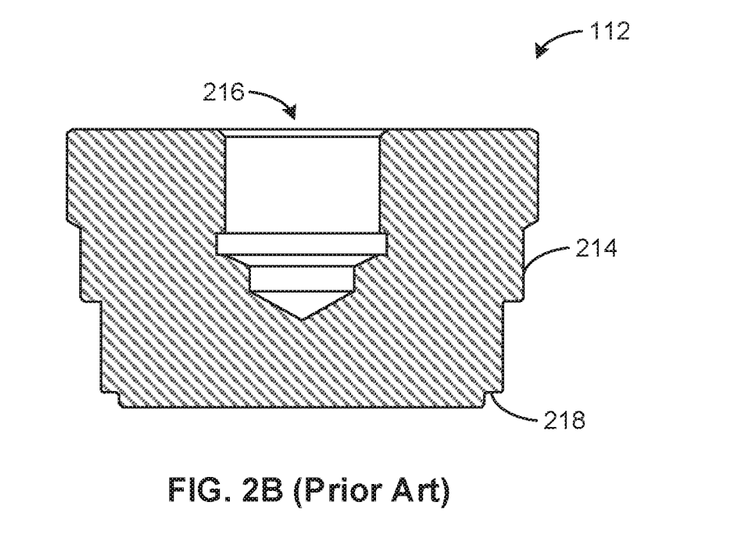
FIG. 2B is a cross-sectional view of the example known soft seat retainer of FIG. 1.

FIG. 2B is a cross-sectional view of the example known soft seat retainer 112 of FIG. 1. The soft seat retainer 112 of the illustrated example includes an exterior threaded portion 214 to threadably couple to the interior threaded portion 208 of the soft seat disc 110 of FIG. 2A. In other examples, the soft seat retainer 112 and the soft seat disc 110 can be coupled via any other coupling means (e.g., press fit, welding, soldering, snap fit, etc.). The soft seat retainer 112 further includes a stem cavity 216 to receive a stem of the fluid valve (e.g., the stem 118 of FIG. 1). The stem 118 is capable of controlling the position of the soft seat retainer 112 and the soft seat disc 110 (e.g., when the soft seat disc 110 and the soft seat retainer 112 are coupled). The soft seat retainer 112 further includes a shoulder 218 that retains a seal (e.g., the seal 114 of FIG. 1) between the shoulder 218 and the angled surface 212 of the soft seat disc 110.

During installation, the seal 114 is positioned on the shoulder 218 of the soft seat retainer 112 and adhered to the shoulder 218 using a silicone lubricant. The soft seat retainer 112 is then threadably coupled to the soft seat disc 110. In some examples, the soft seat retainer 112 is threadably coupled to the soft seat disc 110 using a torque wrench. In some examples, the seal 114 is held in position by a service person (e.g., a person holds the seal 114 in position). Proper installation of the soft seat retainer 112 into the soft seat disc 110 is thus cumbersome and/or requires an experienced service person.

Figure 3:
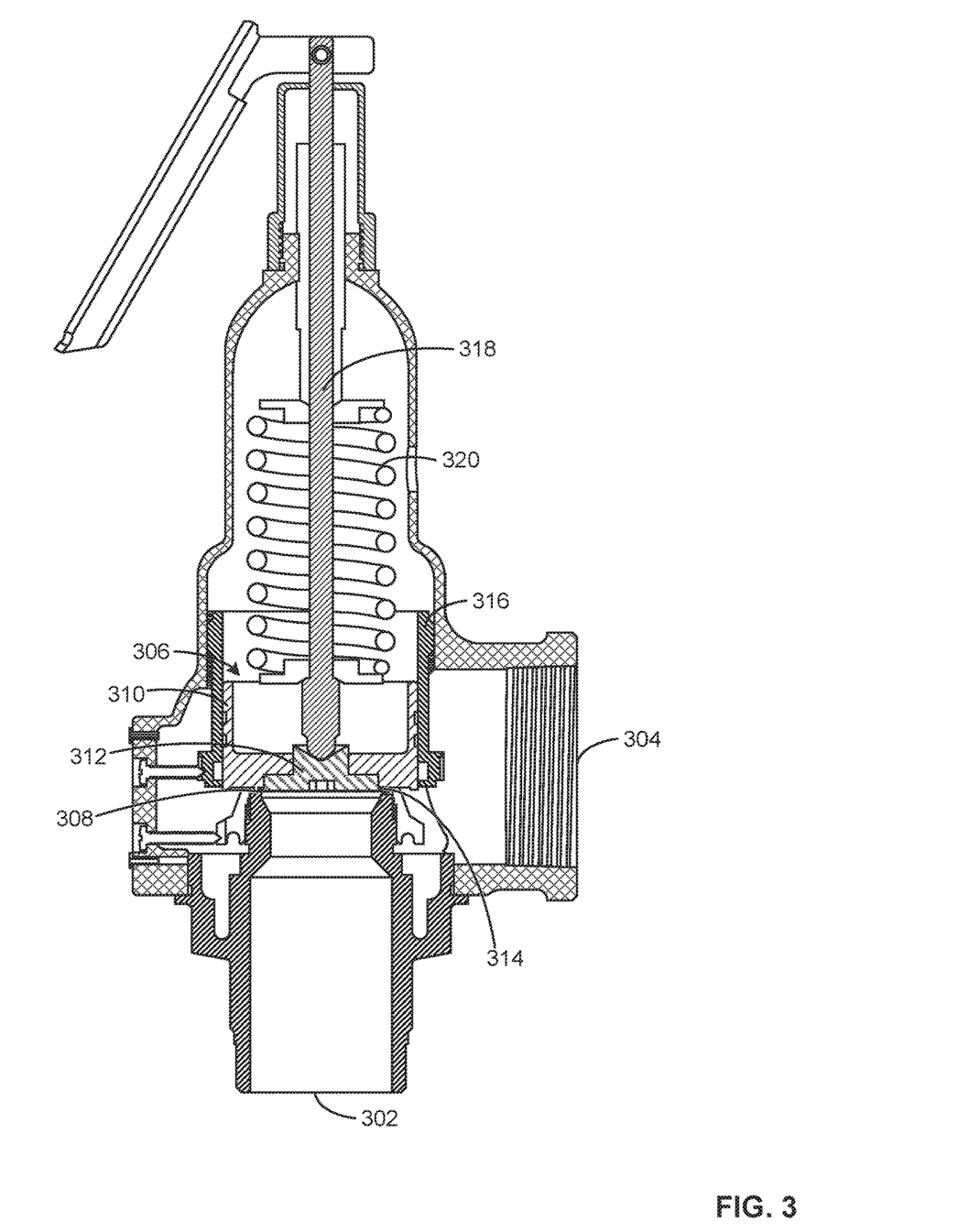
FIG. 3 is a cross-sectional view of an example fluid valve within which the teachings of this disclosure may be implemented.

FIG. 3 is an example fluid valve 300 within which the teachings of this disclosure may be implemented. In the illustrated example, the fluid valve 300 is a pressure relief valve. Alternatively, in some examples, the fluid valve 300 is a globe valve, a check valve, or any valve having a circular or ring-shaped seal. The fluid valve 300 includes an example inlet 302 and an example outlet 304 through which fluid enters and exits the fluid valve 300, respectively. In some examples, the inlet 302 and the outlet 304 are threaded to couple to other devices or apparatus (e.g., a pressure vessel, a tank, a pipe, etc.). In some examples, the outlet 304 is fluidly coupled to the atmosphere to vent fluid to the atmosphere. In the illustrated example, an example valve disc assembly 306 releasably engages an example seating surface 308 to control fluid flow in the fluid valve 300. When the valve disc assembly 306 is in contact with the seating surface 308, the valve disc assembly 306 prevents fluid flow within the fluid valve 300. Alternatively, when the valve disc assembly 306 is released from the seating surface 308 (e.g., is no longer in contact with the seating surface 308), fluid flows between the inlet 302 and the outlet 304. In some examples, the seating surface 308 is a soft seat (e.g., made from PTFE or an elastomer) and/or is fitted to a body of the fluid valve 300.

The valve disc assembly 306 includes an example soft seat disc 310 and an example soft seat retainer 312. In some examples, the soft seat disc 310 and the soft seat retainer 312 are threadably coupled. In some examples, the soft seat disc 310 and the soft seat retainer 312 are coupled using other coupling means (e.g., press fit, welding, soldering, snap fit, etc.). The valve disc assembly 306 further includes an example seal 314 (e.g., o-rings, Teflon, Kel-F, etc.) between the soft seat disc 310 and the soft seat retainer 312 to prevent fluid from leaking between the valve disc assembly 306 and the seating surface 308 and/or between the soft seat disc 310 and the soft seat retainer 312. The valve disc assembly 306 includes two portions (e.g., the soft seat disc 310 and the soft seat retainer 312) for the purpose of retaining the seal 314 within the valve disc assembly 306.

The soft seat disc 310 is in contact with an example guide 316. The guide 316 guides movement of the soft seat disc 310 and, therefore, the valve disc assembly 306 as it moves within the fluid valve 300. For example, the guide 116 enables only vertical movement of the valve disc assembly 106 in the orientation of FIG. 3. The soft seat retainer 312 is coupled to an example valve stem 318, which urges the soft seat retainer 312 and, therefore, the valve disc assembly 306 toward or away from the seating surface 308. Movement of the stem 318 is controlled by an example spring 320. The spring 320 is designed to require a predetermined force before allowing the stem 318 to urge the valve disc assembly 306 away from the seating surface 308. For example, pressure at the inlet 302 of the fluid valve 300 exerts a force on the valve disc assembly 306 (e.g., a force generated by the pressure multiplied by an area of the valve disc assembly 306). As pressure at the inlet 302 increases, the force exerted on the valve disc assembly 306 increases proportionally. When the force exerted on the valve disc assembly 306 exceeds the predetermined force provided by the spring 320, the valve disc assembly 306 is urged away from the seating surface 308. Thus, fluid is allowed to flow through the fluid valve 300 to the outlet 304. In some examples, as pressure in the fluid valve 300 increases, the valve disc assembly 306 moves further from the seating surface 308, allowing more fluid to flow through the fluid valve 300. In some examples, pressure decreases in the fluid valve 300 when the fluid is allowed to flow, and the valve disc assembly 306 moves toward the seating surface 308 until the valve disc assembly 306 again engages the seating surface 308 (e.g., the valve disc assembly 306 contacts the seating surface 308).

Figure 4:
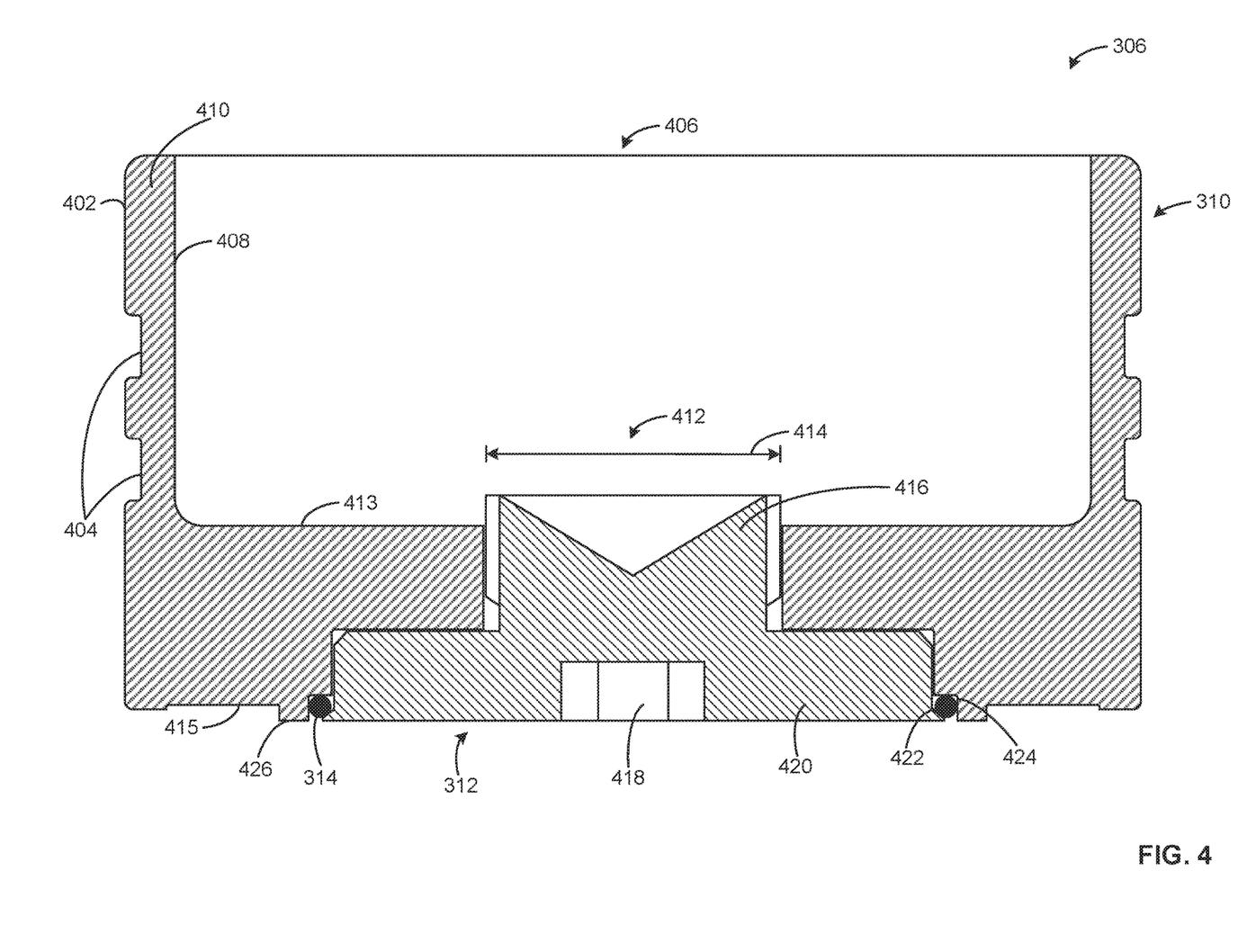
FIG. 4 is a cross-sectional view of the example valve disc assembly of FIG. 3 that includes the example soft seat disc and the example soft seat retainer of FIG. 3.

FIG. 4 is a cross-sectional view of the example valve disc assembly 306 of FIG. 3 that includes the example soft seat disc 310 and the example soft seat retainer 312 of FIG. 3. In some examples, the soft seat disc 310 and the soft seat retainer 312 are made by forging. The soft seat disc 310 of the illustrated example includes a guiding surface 402 to contact a guide of a fluid valve (e.g., the guide 316 of the fluid valve 300). The guiding surface 402 maintains contact with the guide 316 as the valve disc assembly 306 moves vertically within the fluid valve 300 (e.g., due to changes in pressure within the fluid valve 300). The guiding surface 402 includes cavities 404 that reduce drag and/or friction during movement of the valve disc assembly 306 within the fluid valve 300.

The guiding surface 402 of the soft seat disc 310 forms an outer surface of the soft seat disc 310. The soft seat disc 310 further includes an example recess 406, the circumferential boundary of which forms an interior surface 408 of an example guide wall 410. The guide wall 410 is a slender, circumferential wall giving the soft seat disc 310 an annular shape. In the illustrated example, the soft seat disc 310 includes an opening 412 disposed at the center of the soft seat disc 310. The opening 412 begins at a bottom surface 413 of the recess 406 and continues through the soft seat disc 310. The opening 412 is to receive the soft seat retainer 312. The opening 412 has a diameter 414 and is continuous through the soft seat disc 310 (e.g., runs vertically between the bottom surface 413 of the recess 406 and a bottom surface 415 of the soft seat disc 310). The opening 412 of the illustrated example is threaded to receive an example stem portion 416 of the soft seat retainer 312. The stem portion 416 of the illustrated example is also threaded, allowing the soft seat retainer 312 to be threadably coupled to the soft seat disc 310. In some examples, the diameter of the stem portion 416 has a diameter equal to the diameter 414 of the opening 412. In some examples, the soft seat retainer 312 is coupled to the soft seat disc 310 using other coupling means (e.g., welding, soldering, press fit, etc.).

The soft seat retainer 312 further includes a slot cutout 418 that is used to couple the soft seat retainer 312 to the soft seat disc 310. For example, a screwdriver can be inserted into the slot cutout 418 to apply the proper torque to couple the soft seat retainer 312 to the soft seat disc 310 (e.g., by threading the soft seat retainer 312 into the soft seat disc 310). In some examples, the slot cutout 418 is created by broaching the soft seat retainer 312 (e.g., by linear broaching, rotary broaching, etc.). In some examples, the slot cutout 418 includes a different profile (e.g., hex, square, star, etc.).

The soft seat retainer 312 of the illustrated example includes a base portion 420 that includes an angled surface 422. In the illustrated example, the angled surface 422 faces radially outward (e.g., in a direction away from a central axis of the soft seat retainer 312 and/or a central axis of the valve disc assembly 306) and includes a vertical and horizontal component. As the angled surface 422 proceeds away from the central axis of the soft seat retainer 312, the angled surface 422 is slanted in a downward direction. In some examples, the angled surface 422 is rounded (e.g., radiused) at an outer end and/or includes a vertical face at the outer end (e.g., an end furthest from the central axis of the soft seat retainer 312). In the illustrated example, the base portion 420 has a diameter that is greater than the diameter 414 of the opening 412 of the soft seat disc 310. The seal 314 (e.g., an o-ring, etc.) is retained between the angled surface 422 and an example shoulder 424 of the soft seat disc 310.

During installation, the soft seat retainer 312 is threadably coupled to the opening 412 of the soft seat disc 310 from a base of the soft seat disc 310 (e.g., the stem portion 416 is inserted into the bottom of the opening 412). The seal 314 is placed on a shoulder 424 of the soft seat disc 310 (e.g., by holding the soft seat disc 310 upside-down) and is automatically stretched when the soft seat retainer 312 is coupled to the soft seat disc 310 because of the angled surface 422. For example, as the soft seat retainer 312 is threadably coupled to the soft seat disc 310 via the opening 412, the part of the angled surface 422 in contact with the seal 314 increases in diameter (e.g., the seal 314 moves outward along the angled surface 422), causing the seal 314 to stretch. In some examples, the seal 314 is lubricated before being positioned on the shoulder 424 to facilitate installation. In some such examples, the lubricant is a non-silicone lubricant (e.g., Super Lube® Grommet Lube, Cool® Tool II, etc.). When the soft seat retainer 312 is properly positioned (e.g., the installation is complete), the seal 314 is sufficiently stretched and prevents fluid from leaking between the valve disc assembly 306 and a seating surface (e.g., the seating surface 308 of FIG. 3) and/or the soft seat disc 310 and the soft seat retainer 312. In some examples, the seal 314 protrudes below the base portion 420 (e.g., ten thousandths of an inch below the base portion 420). Further, the seal 314 is advantageously urged away from an interface of the soft seat disc 310 and the soft seat retainer 312 (e.g., protrudes further below the base portion 420) when pressure increases in the fluid valve 300. The movement of the seal 314 away from the interface prevents the seal 314 from extruding into a space between the soft seat disc 310 and the soft seat retainer 312.

When the valve disc assembly 306 has been installed in the fluid valve 300, the stem portion 416 of the soft seat retainer 312 is coupled to the stem 318 of the fluid valve 300. The stem 318 controls movement of the valve disc assembly 306, and the guiding surface 402 contacts the guide 316 of the fluid valve 300 to maintain proper positioning of the valve disc assembly 306. The soft seat disc 310 further includes an example seat interface 426 that contacts a valve seat (e.g., the seating surface 308 of FIG. 3) of the fluid valve 300. The seat interface 426 contacts the seating surface 308 when the fluid valve 300 is closed (e.g., the fluid valve 300 prevents flow between the inlet 302 and the outlet 304 of FIG. 3). In some examples, the seal 314 additionally engages the seating surface 308. The seat interface 426 and the seal 314 are released from (e.g., no longer in contact with) the seating surface 308 when the pressure increases above a maximum pressure (e.g., when the force exerted on the valve disc assembly 306 is greater than the biasing force caused by the example spring 320 of FIG. 3).

From the foregoing, it will be appreciated that example valve disc assemblies for fluid valves having soft seats has been disclosed herein. The valve disc assembly 306 offers improvements over known valve disc assemblies (e.g., the valve disc assembly 106 of FIGS. 1-2B). The valve disc assembly 306 requires less material to form the soft seat disc 310 and the soft seat retainer 312 (e.g., shorter in length, smaller diameter of retainer, etc.), reducing raw material costs for manufacturing the valve disc assembly 306. Additionally, the soft seat disc 310 can be forged (e.g., instead of casting), which further reduces the amount of raw material used. The geometry of the soft seat disc 310 is faster to machine than the known soft seat disc 110, decreasing manufacturing time. Further, the installation of the seal 314, when coupling the soft seat retainer 312 to the soft seat disc 310, is made more efficient and less complex due to the installation method disclosed above. For example, the method of installing the seal 114 of FIG. 1 during the coupling of the known soft seat retainer 112 of FIG. 1 to the known soft seat disc 110 of FIG. 1 requires an experienced service person. In some examples, as disclosed above, the angled surface 422 of the soft seat retainer 312 stretches the seal 314 without intervention from a service person (e.g., the seal 314 is stretched during installation as it moves along the angled surface 422), reducing the complication of installing the seal 314.

Further, coupling of the soft seat retainer 312 to the soft seat disc 310 requires less torque than was needed to couple the known soft seat retainer 112 to the known soft seat disc 110. For example, previous methods required several ft-lbs. of torque, while the valve disc assembly 306 disclosed herein requires only inch-lbs. of torque. The method used to couple the soft seat retainer 312 to the soft seat disc 310 further enables different sealing materials to be used, eliminating the need for a silicone-based lubricant. Silicone lubricants were used when coupling the known soft seat retainer 112 to the known soft seat disc 110 because of the adhesive properties of the silicone lubricant (e.g., the lubricant was necessary to keep the seal 114 in position on the shoulder 424). In some cases, lubricants including silicone hinder downstream processes (e.g., painting of a valve disc assembly, a fluid valve, and/or system or apparatus in which the valve disc assembly is implemented), limiting the applications for which the valve disc assembly 306 can be used. Thus, the valve disc assembly 306 disclosed herein can be used in a wider variety of applications because it does not include silicone.

Because the angled surface 422 of the soft seat retainer 312 is disposed on the outside of the soft seat retainer 312, a better surface finish (e.g., less surface roughness, fewer surface irregularities, etc.) can be attained. This is unlike the known valve disc assembly 106, which includes an angled surface (e.g., the angled surface 212 of FIG. 2A) on the soft seat disc 110 that is on an interior surface of the soft seat disc 110. The interior surface is difficult for a service person to reach with the necessary machining tools (e.g., a lathe, lapping machine, etc.) and to see during manufacturing and/or assembly. Additionally, due to the position of the angled surface 422, measuring the angle of the angled surface 422 (e.g., to ensure the angled surface 422 is within a specified tolerance) is easier, and the measurements are more accurate.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A valve disc assembly for a fluid valve, comprising:
a first portion to slidably engage a wall of the fluid valve to guide movement of the valve disc assembly, the first portion including an internally threaded bore;
a second portion to receive a valve stem to control a position of the valve disc assembly, the second portion including an angled surface to retain a seal between the first and second portions, the seal to releasably engage a valve seat, the second portion including an externally treaded protrusion; and
a slot cutout disposed on the second portion to receive a key to join the first portion to the second portion, the seal to stretch along the angled surface to prevent fluid leakage between the first and second portions when the key is turned to join the first and second portions by engaging the internally threaded bore of the first portion with the externally threaded protrusion of the second portion.

2. The valve disc assembly of claim 1, wherein the angled surface faces radially outward relative to a central axis of the valve disc assembly to engage the seal.

3. The valve disc assembly of claim 2, wherein the seal moves away from an interface between the first portion and the second portion when pressure in the fluid valve increases.

4. The valve disc assembly of claim 1, wherein the internally threaded bore of the first portion has a first diameter.

5. The valve disc assembly of claim 4, wherein the angled surface is disposed on a base of the second portion, the base having a second diameter greater than the first diameter.

6. The valve disc assembly of claim 1, wherein the first portion engages the valve seat when pressure within the fluid valve is below a maximum pressure.

7. The valve disc assembly of claim 1, wherein the seal is lubricated with a non-silicon lubricant.

8. A valve disc assembly for a fluid valve, comprising:
an integral first portion having an opening to receive a second portion and to slidingly engage a wall of the fluid valve, the first portion including a seat interface flange extending therefrom, the second portion to receive a valve stem to control a position of the valve disc assembly, the second portion including an angled surface, the seat interface flange of the first portion and the angled surface of the second portion to retain a seal therebetween; and
a valve seat, the seal to releasably engage the valve seat, the seat interface flange extending towards the valve seat and displaced from the wall of the fluid valve.

9. The valve disc assembly of claim 8, wherein the angled surface faces radially outward relative to a central axis of the valve disc assembly to engage the seal.

10. The valve disc assembly of claim 9, wherein the seal moves away from an interface between the first portion and the second portion when pressure in the fluid valve increases.

11. The valve disc assembly of claim 8, wherein the angled surface is disposed on a base of the second portion, the base having a second diameter greater than a first diameter of the opening.

12. The valve disc assembly of claim 8, wherein the seal is stretched when the second portion is threadably coupled to the first portion.

13. The valve disc assembly of claim 8, wherein the seal is lubricated with a non-silicon lubricant.

14. A valve disc assembly for a fluid valve, comprising:
an integral first portion including an opening and to slidingly engage a wall of the fluid valve, the opening having a first diameter, the first portion including a seat interface flange extending therefrom;
a second portion including a stem portion to receive a valve stem to control a position of the valve disc assembly, the stem portion to couple the second portion to the first portion through the opening, the second portion including an angled surface, the seat interface flange of the first portion and the angled surface of the second portion to retain a seal therebetween, the base having a second diameter greater than the first diameter; and
a valve seat, the seat interface flange extending towards the valve seat and displaced from the wall of the fluid valve.

15. The valve disc assembly of claim 14, wherein the angled surface faces radially outward relative to a central axis of the valve disc assembly to engage the seal.

16. The valve disc assembly of claim 15, wherein the seal moves away from an interface between the first portion and the second portion when pressure in the fluid valve increases.

17. The valve disc assembly of claim 15, wherein the seal is stretched when the stem portion is threadably coupled to the opening of the first portion.

18. The valve disc assembly of claim 14, wherein the seal releasably engages the valve seat.

19. The valve disc assembly of claim 14, wherein the first portion engages the valve seat when pressure within the fluid valve is below a maximum pressure.

20. The valve disc assembly of claim 14, wherein the seal is an O-ring lubricated with a non-silicon lubricant.

* * * * *